United States Patent [19]
Dulaney

[11] 4,452,478
[45] Jun. 5, 1984

[54] NUCLEAR WASTE STORAGE PROCESS AND SYSTEM

[76] Inventor: Floyd M. Dulaney, 199 Tollview Road, Elgin, Ill. 60120

[21] Appl. No.: 177,177

[22] Filed: Aug. 11, 1980

[51] Int. Cl.³ .................. E21B 31/00; E21B 31/12; G21F 9/22
[52] U.S. Cl. .................. 294/86.28; 405/128; 294/86.29
[58] Field of Search ........... 405/53, 55, 128, 133, 405/270; 294/86 A, 86.28, 86.29, 86.32; 414/22, 69; 166/305 D, 247, 302, 285; 252/633; 250/506, 507

[56] References Cited
FOREIGN PATENT DOCUMENTS
622015 4/1965 France .................. 294/86.28

Primary Examiner—Cornelius J. Husar
Assistant Examiner—Nancy J. Stodola
Attorney, Agent, or Firm—Laff, Whitesel, Conte & Saret

[57] ABSTRACT

A system to transport and deposit nuclear wastes for disposal into abandoned or dry oil wells or other wells or deep holes. The system includes a device for connecting to a canister which holds nuclear waste material, for transporting the canister to a well shaft, for lowering the canister to the bottom of the shaft, and for releasing the canister at the shaft bottom. The device includes spring-biased, self-releasing hooks which deposit the canister in the well and are actuated by a weighted plunger rod. The rod is connected to a cable, pulley and winch which are used to lower the device.

6 Claims, 12 Drawing Figures

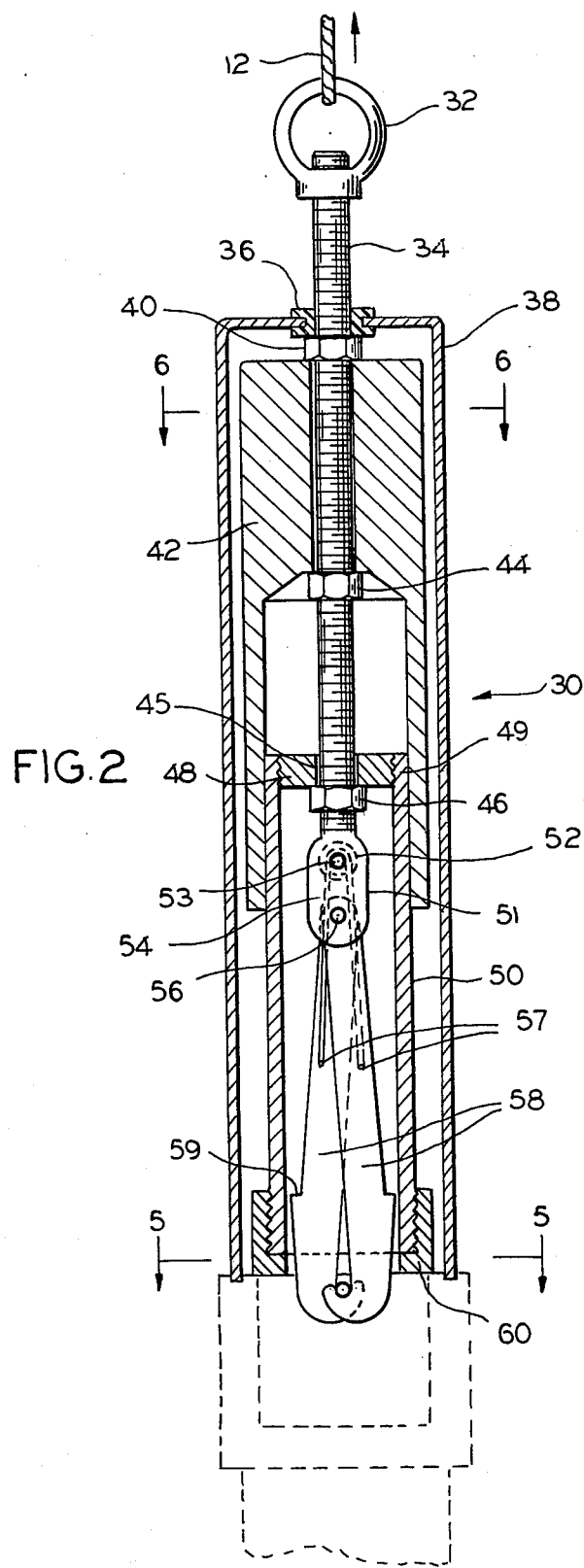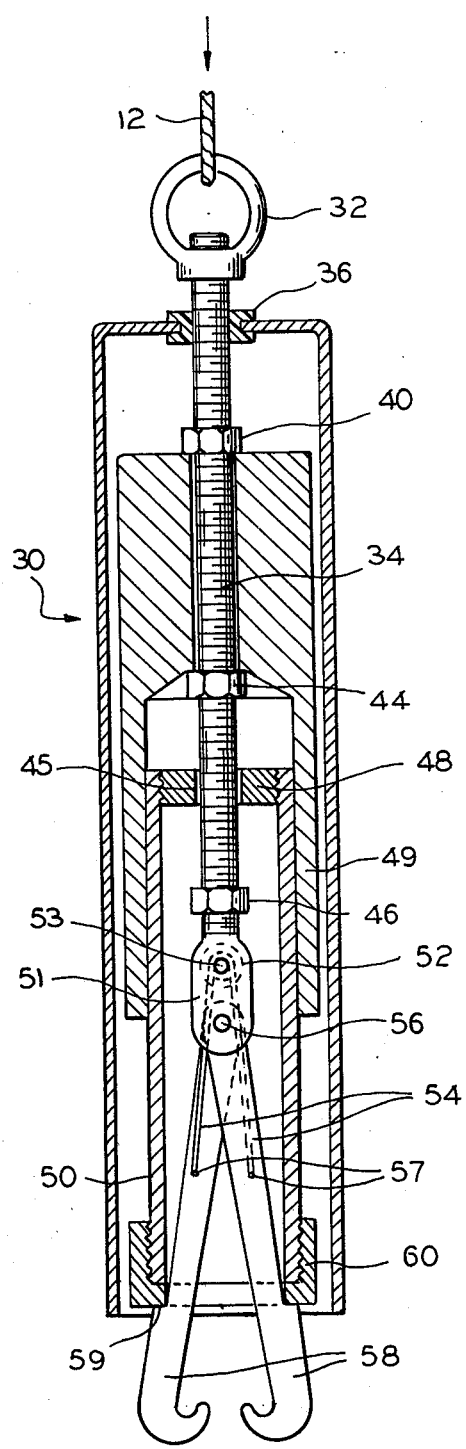

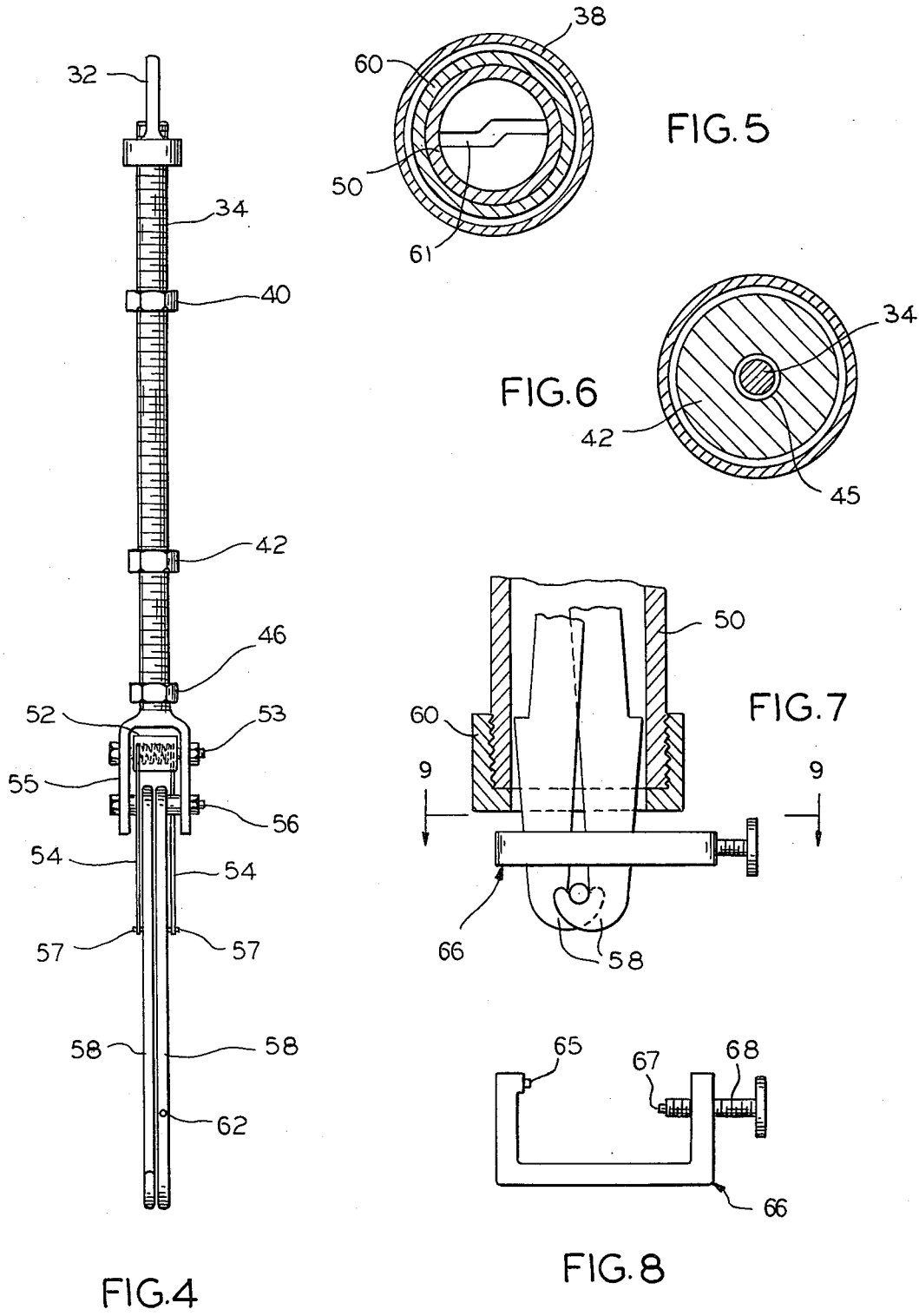

NUCLEAR WASTE STORAGE PROCESS AND SYSTEM

BACKGROUND OF THE INVENTION

This invention relates to a method for storing nuclear waste and for safely transporting and depositing such waste into a storage facility and a system and device for accomplishing these objects. The invention greatly reduces the danger of contamination to humans, animals and plants and takes advantage of existing, but unused, storage facilities.

Nuclear waste is any sort of material which contains or has deposited on it, unstable nuclides of a relatively long half-life which emit alpha, beta or gamma radiation. This waste may be in the form of used nuclear reactor fuel rods; sludge produced during reprocessing or separating nuclear material; contaminated vials and syringes used in nuclear medicine or scientific research; or a variety of contaminated clothing, waste paper, or filtration media used in nuclear power plants.

Due to current heavy reliance on nuclear energy, nuclear medicine, and other nuclear application, substantial quantities of potentially dangerous nuclear wastes are being generated. These wastes require a safe method of disposal or storage to avoid contamination to life forms. Heretofore, a number of waste disposal methods for storing refuse from nuclear power plants, nuclear reprocessing facilities or nuclear medicine facilities have been proposed. Long-term methods which provide safe disposal over the life time of the dangerous wastes include methods such as the burial of waste as described in Bellere U.S. Pat. No. 3,236,053; burial in vaults as descibed in Backstrom U.S. Pat. No. 3,925,992, Chesson U.S. Pat. No. 4,189,254, or Hallerius et al. U.S. Pat. No. 4,192,629; injection into geologic fractures as described in Reynolds et al. U.S. Pat. No. 3,108,439, Stogner U.S. Pat. No. 3,513,100, Nelson U.S. Pat. No. 3,262,274, or Slagle et al. U.S. Pat. No. 3,379,013; or plugging the waste into descending geologic formations as described in Kristerial U.S. Pat. No. 4,178,109. Short-term methods which provide a temporary storage site for low level wastes are currently in use and they include such methods as the burial of waste containing metal drums in earthen trenches.

Problems are inherent with all currently used or proposed methods for nuclear waste disposal. With short-term disposal methods, water attacks and deteriorates the buried metal drums. As a result, above-normal levels of radioactive isotopes are now found in water tables surrounding waste burial sites. No long-term disposal method is currently in use. However, of the prior art which has been cited, all of these proposed methods would be expensive and would require extensive development and construction before implementation.

Accordingly, an object of this invention is to provide a safe and expeditious method for disposal of nuclear wastes and to provide means by which this method can be practiced. Another object of this invention is to provide a system and method for economically storing nuclear wastes by utilizing pre-existing wells.

Further objects will be apparent from the description, drawings and claims.

SUMMARY OF THE INVENTION

In keeping with an aspect of the invention, nuclear waste is placed within a suitable container, such as a glass-lined canister. The canister is lifted by a couple having spring-biased hooks at the bottom of a plunger rod extending axially through the canister. The hooks are released or compressed by a vertically sliding capsule within the couple whose position is determined by the net vertical force produced by a winch and cable attached to the top of the plunger rod. When the canister is being transported, the hooks are closed about the canister; when the canister is in the proper position to be deposited, the hooks are released.

These and other features of the invention will be further understood by reference to the following description and accompanying drawings.

BRIEF DESCRIPTION OF THE DRAWINGS

FIG. 2 is a cross-sectional view of a portion of the embodiment of FIG. 1 showing the opposed hooks of the coupling in a closed position connected to the waste-holding canister shown partially in dotted lines.

FIG. 3 is a cross-sectional view of the embodiment of FIG. 2 showing the hooks in an open position.

FIG. 4 is a side plan view of a portion of the embodiment of FIG. 2.

FIG. 5 is a cross-sectional view taken along lines 5—5 of FIG. 2.

FIG. 6 is a cross-sectional view taken along lines 6—6 of FIG. 2.

FIG. 7 is a partial cross-sectional view of the embodiment of FIG. 2 and showing a loading C-clamp connected to the hooks.

FIG. 8 is a plan view of the loading C-clamp shown in FIG. 7.

DESCRIPTION OF THE PREFERRED EMBODIMENT

Figure 1:
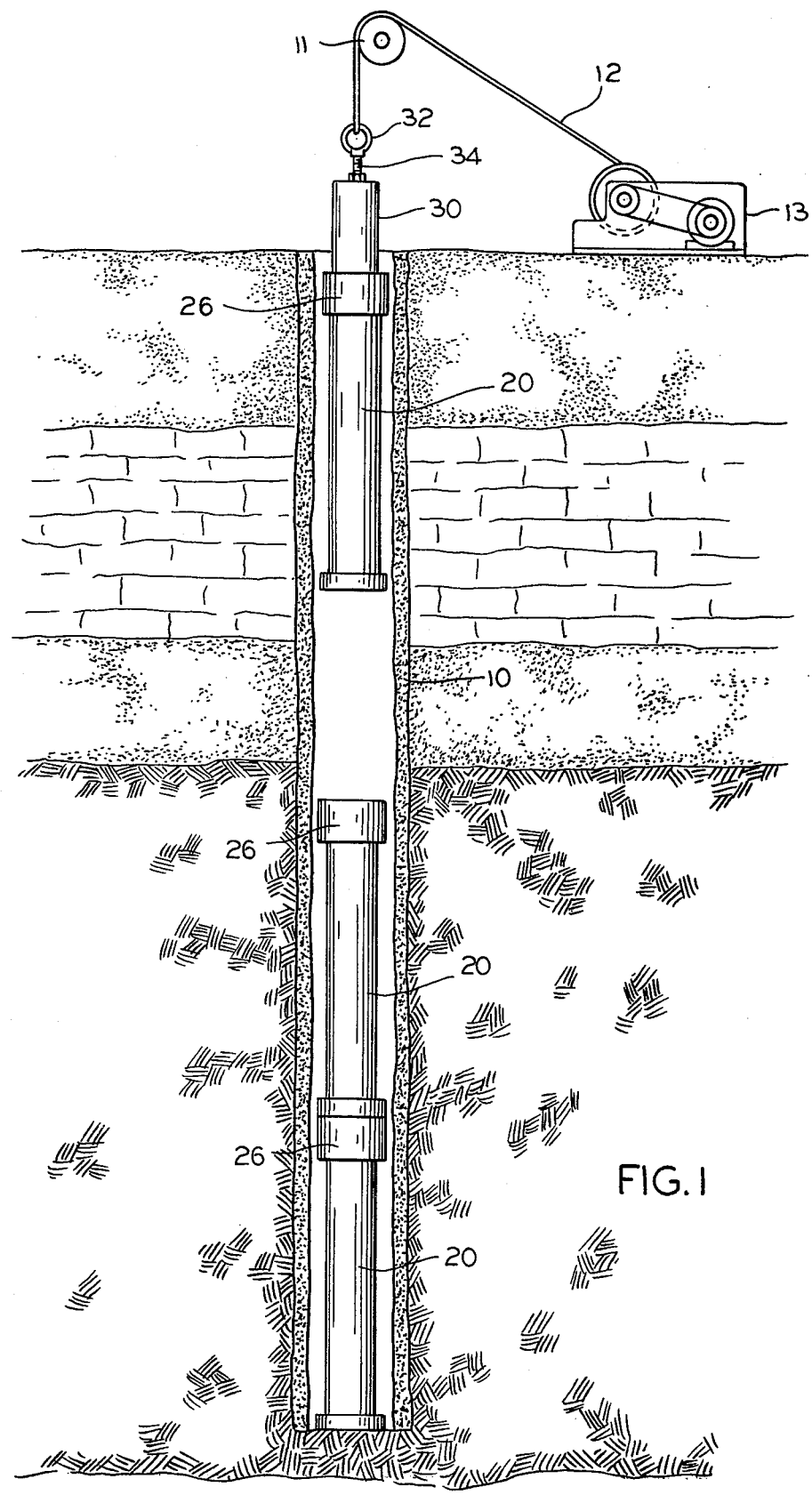
FIG. 1 is a diagramatic view of one embodiment of the invention showing the waste-holding canister being lowered into a well shaft for stacking on top of similar canisters.

As shown in FIG. 1, the system includes a couple 30 used to lower canister 20 into an oil well 10 dug in the earth. Couple 30 is attached to cable 12 which passes over pulley 11 to winch 13.

The canister 20 is preferably cylindrical, with a diameter slightly less than the diameter of the well 10 and is desirably 1 to 2 inches less than the diameter of the well. This difference in diameters allows the passage of oil and sludge between the canister 20 and the shaft wall of well 10, which protects the canister from corrosion and insures that the radioactive contents will not leak out. Preferably, more than one canister may be lowered into a well, and the canisters should be aligned directly one above the other in a uniform column. This alignment encourages the entire column to sink deeper into the sludge and decreases the possibility of radioactive leakage. For this reason, canisters which are substantially smaller in diameter than the well 10 are not desirable because they make accurate alignment of the canisters more difficult.

FIGS. 2—6 show the preferred embodiment of couple 30. The couple 30 comprises a plunger rod 34 and opposing hooks 58, each having a notch 59 along its length. Surrounding rod 34 and hooks 58 is a capsule 49 which is formed from cylinder 50, a top member 48 screwed into cylinder 50, and a bottom member 60 screwed over cylinder 50. Top member 48 and bottom member 60 have openings 45 (FIG. 6) and 61 (FIG. 5) which allow the plunger rod 34 and hooks 58 to extend outside the capsule 49 and permit the capsule 49 to move freely up and down the plunger rod 34 between lock nuts 46 and 44 on plunger rod 34. The couple 30 also includes a heavy steel or lead weight 42 secured by lock nuts 40 and 44 to rod 34.

Sludge shield 38 is attached to plunger rod 34 by a felt or rubber ring 36 which slides loosely along plunger rod 34. The sludge shield protects the couple 30 from oil or sludge which would hinder the workings of couple 30. Of course, if the well in which the canister is to be stored is dry, the shield may be removed by unscrewing eyelet 32 and removing sludge shield 38 and ring 36.

A yoke 51 on the lower end of plunger rod 34 connects hooks 58 and also holds a spool 52 which contains spring 54. The spool 52 and spring 54 are held in place by a bolt 53 which passes between the two forks 55 of yoke 51. Also bolted between the forks 55 of the yoke 51 are the opposing hooks 58 which pivot on bolt 56. The ends of spring 54 are attached to the hooks 58 by a pin 57. The lower portion of the hooks 58 extends through an offset slot 61 in the bottom member 60, and the hooks are thereby held in proper orientation.

Figure 10:
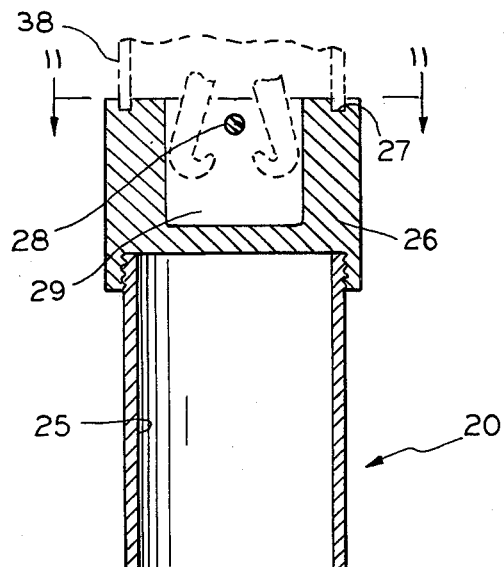
FIG. 10 is a partial cross sectional view of the canister of FIGS. 1 and 2 and showing a portion of the hooking means in dotted lines.
Figure 11:
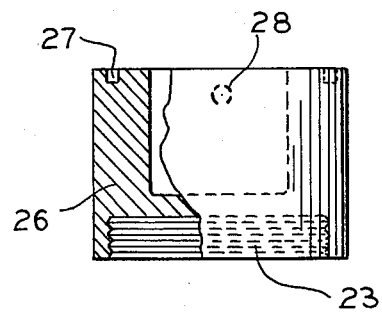
FIG. 11 is a top plan view of the canister taken along line 11—11 in FIG. 10.
Figure 12:
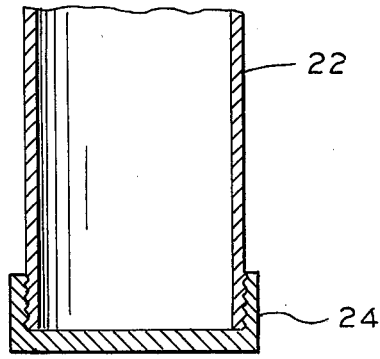
FIG. 12 is a partial cross-sectional view of the top portion of the canister of FIG. 10.

FIGS. 10—12 show the canister 20 in more detail. Canister 20 is a threaded metal cylinder 22 preferably constructed with an outer shell of corrosion resistent metal and an inner lining of glass. The cylinder 22 is closed at the bottom by a threaded cap 24 and on the top by a threaded cap 26. The top cab 26 has a central recess or well 29 and a cross bar 28 which spans the recess 29. The recess 29 is deep enough to allow the opposing portions of hook 58 to pass under and engage cross bar 28. Cap 26 also contains an annular channel 27 which corresponds to the circumference of sludge shield 38 and receives the shield when the hooks 58 are connected to the canister.

Figure 9:
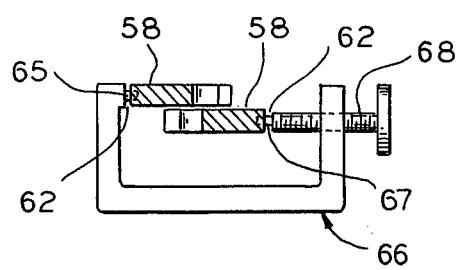
FIG. 9 is a cross-sectional view of the loading C-clamp and hooks taken along lines 9—9 of FIG. 7.

Couple 30 is connected to cable 12 via eyelet 32 which is screwed on to the end of plunger rod 34. As couple 30 is lowered over a waste filled canister 20, the hooks 58 will descend into the recess 29. At this time, the hooks are completely separated by spring 54. A C-clamp 66, shown in FIGS. 7, 8 and 9, is applied to partially close the hooks 58 and release them from their locked open position due to lock notch 59. The C-clamp includes a movable shaft 68 and pins 65 and 67 which engage the holes or recesses 62 in the sides of the hooks 58. As shaft 68 is screwed closed, the pins 65 and 67 continue to engage recesses 62 in hooks 58 and force the spring-biased hooks 58 to close. When hooks 58 are closed sufficiently to allow notch 59 to clear the slot 61 in bottom member 60, the capsule 49 will partially enclose hooks 58 so that notches 59 engage bottom member 60 of capsule 49. This engagement locks the hooks in a partially biased position, and the C-clamp 66 can be removed. As the couple 30 is lifted by the cable 12 and winch 13, an upward vertical force is exerted on the plunger rod 34 which exceeds the downward vertical force exerted on plunger rod 34 by the weight 42. This net force causes sludge shield 38 to fit into channel 27, bottom member 60 to rest on cap 26, capsule 49 to slide downward relative to plunger rod 34 and past the notches 59 of hooks 58, and hooks 58 to completely lock around cross-bar 28. The couple 30 and canister 20 can then be hoisted and lowered into an oil well 10.

When the canister 20 reaches the bottom of the well the cable 12 continues to play out and the plunger, which is free to continue the downward motion, continues its downward motion aided by the force of weight 42. The plunger rod 34 moves downward relative to capsule 49 which, since it is resting on top of canister 20, remains stationary and hooks 58 are pushed outside cylinder 50 to spring towards their biased position, thereby releasing cross-bar 28 and canister 20. The hooks 58 will remain in a partially open position since notch 59 engages bottom member 60 of capsule 49. Couple 30 can then be removed by winch 13, leaving capsule 20 within shaft 10.

This method of storing nuclear wastes provides an immediate and economical solution to the need for nuclear waste disposal methods. Because the canisters are stored in an oil sludge or a completely dry well, this method also provides a solution to the problem of waste canister corrosion which renders previous nuclear waste disposal methods impractical and dangerous.

The corrosion resistant metal which forms the canister must have sufficient tensile strength to withstand the weight of the canisters stacked above so that the canisters do not burst and dispel the radioactive contents. Additional tensile strength which will increase the allowable height of the stack may be obtained by filling the interstitial space between the nuclear waste products in the canister with molten glass or some similar material which fills the canister completely and forms a solid core inside the canister.

The invention is preferably employed in connection with, and provides use for, existing oil wells and shafts, although a special shaft may be drilled for this purpose.

The use of abandoned or dry oil wells to store nuclear waste provides two advantages. Such wells are already in existence, thereby providing a ready and economical storage site. In addition, abandoned wells contain an oil sludge which protects the metal canisters from corrosion. Dry wells either contain no water, thereby posing no corrosion problem, or they can be pumped full of oil sludge which would protect the canisters from corrosion.

If an abandoned oil well is used, pulley 11 and winch 13 may already exist in the oil derrick erected over said well. If no oil derrick remains over the well head, such a derrick can easily be constructed using the structures currently available within the oil drilling industry.

Approximately 10,000 to 15,000 feet of cable is generally needed to practice the inventive system, depending on the depth of the well. Such cable may be of steel, hemp, or as long as the ambient heat is less tha 200° F., a polypropylene cable will serve.

Couple 30, while being used here to serve as a connection means between the cable and a nuclear waste filled canister, may also serve as a connection means for hoisting any sort of material or object.

While the principles of the invention have been described above in connection with specific apparatus and applications, it is to be understood that this description is made only by way of example and not as a limitation on the scope of the inventive method or device.

I claim:

1. A system for depositing a container in a vertical shaft, said system comprising a hoisting means; an elongated plunger rod secured at one end to said hoisting means; a pair of elongated arms each having one end pivotally mounted on the other end of said plunger rod for movement between an opened and a closed position, each of said arms terminating at the other end in a bight, the bights confronting each other to form a loop when said arms are in the closed position for releasably engaging said container; spring-biased means interconnected between said pair of arms for normally urging said pair of arms to said opened position; a first capsule slidably mounted on said plunger rod, said capsule having an excursion limited by an upper and lower abutment on said plunger rod and being shaped to surround and embrace said pair of arms to lock said arms in said closed position when said capsule rests on said lower abutment and to enable said pair of arms to open when said capsule is a predetermined distance above said lower abutment; a weight affixed to said plunger rod above said upper abutment; a second capsule slidably mounted on said plunger rod, said second capsule having an excursion limited by said hoisting means at the upper end by said weight at the lower end and being shaped to surround said weight and first capsule.

2. The system of claim 1 wherein said pair of arms includes a notch on each of said arms for engaging said first capsule and locking said arms in said opened position.

3. The system of claim 2 wherein said container has a channel formed in its top for receiving the lower end of said second capsule.

4. The system of claim 3 wherein said container has a recess with at least one bar transversing the recess for releasably engaging said bights when said pair of arms are in the closed position.

5. The system of claim 4 wherein said hoisting means comprises a cable secured at one end to said plunger rod; a pulley about which the cable is wound; and a winch secured to the other end of said cable.

6. A coupling device for depositing a container in a vertical shaft, said device comprising an elongated plunger rod; an elongated grasping means having an opened and closed position and being terminated in at least one bight for removably engaging said container, said grasping means being pivotally mounted on the bottom of said plunger rod for movement between said opened and closed positions; means secured to said grasping means for normally urging said grasping means to said opened position; a first capsule slidably mounted on said plunger rod, said capsule being shaped to surround and embrace said grasping means to lock said grasping means in said closed position when said first capsule slides to a first predetermined position on said plunger rod and to enable said grasping means to open when said first capsule slides to a second predetermined position on said plunger rod; a weight affixed to said plunger rod above said second predetermined position; a second capsule slidably mounted on said plunger rod and shaped to surround said first capsule and said weight, said second capsule having an excursion limited by said weight at the lower end and by an abutment on said plunger rod at the upper end.

* * * * *